United States Patent
Yip et al.

(10) Patent No.: US 6,618,388 B2
(45) Date of Patent: Sep. 9, 2003

(54) METHOD AND SYSTEM FOR VMAN PROTOCOL

(75) Inventors: Michael Yip, Sunnyvale, CA (US); Steve Haddock, Los Gatos, CA (US)

(73) Assignee: Extreme Networks, Santa Clara, CA (US)

( * ) Notice: Subject to any disclaimer, the term of this patent is extended or adjusted under 35 U.S.C. 154(b) by 0 days.

(21) Appl. No.: 09/755,736

(22) Filed: Jan. 5, 2001

(65) Prior Publication Data

US 2002/0089992 A1 Jul. 11, 2002

(51) Int. Cl.[7] .................................... H04L 12/56
(52) U.S. Cl. ........................... 370/401; 370/474
(58) Field of Search .......................... 370/389, 392, 370/396, 397, 399, 400, 401, 402, 409, 427, 474, 465, 470, 471, 475

(56) References Cited

U.S. PATENT DOCUMENTS

| | | | |
|---|---|---|---|
| 4,897,874 A | * | 1/1990 | Lidinsky et al. ............ 370/427 |
| 5,027,350 A | | 6/1991 | Marshall |
| 5,088,032 A | | 2/1992 | Bosack |

(List continued on next page.)

OTHER PUBLICATIONS

R. Woodburn, "A Scheme for an Internet Encapsulation Protocol: Version 1," Request for Comments: 1241, Jul. 1991 ("RFC1241").
B. Elliston, "Encapsulating IP ith the Small Computer System Interface," Request for Comments 2143, May 1997, ("RFC2143").

S. Kent, et al., "IP Encapsulating Security Payload (ESP)," Request for Comments 2406, Nov. 1998, ("RFC2406").
D. Farinacci, et al., "Generic Routing Encapsulation (GRE)," Request for Comments 2784, Mar. 2000, ("RFC2784").
S. Hanks, et al., "Generic Routing Encapsulation over IPv4 Networks," Request for Comments 1702, Oct. 1994, ("RFC1702").
S. Hanks, et al., "Generic Routing Encapsulation (GRE)," Request for Comments 1701, Oct. 1994, ("RFC1701").
C. Perkins, "Minimal Encapsulation within IP," Request for Comments 2004, Oct. 1996, ("RFC2004").
C. Perkins, "IP Encapsulation within IP," Request for Comments 2003, Oct. 1996, ("RFC2003").
W. Simpson, "IP in IP Tunneling," Request for Comments 1853, Oct. 1995, ("RFC1853").

(List continued on next page.)

*Primary Examiner*—Chau Nguyen
*Assistant Examiner*—Soon-Dong Hyun
(74) *Attorney, Agent, or Firm*—Blakely, Sokoloff, Taylor & Zafman (57) ABSTRACT

A method and system is provided in which MAN traffic is segregated at a customer and a provider domain level. A switch at the edge of the MAN encapsulates a data packet in a new header, which is used to specify the customer domain tags. The data packet is encapsulated further in another new header, which is used to specify new VMAN tags. The nested encapsulation is repeated as necessary until the data packet is forwarded to a remote switch at the edge of the MAN in accordance with the VMAN configuration or the source and destination address in the original data packet. The remote switch strips the VMAN tags from the data packet, and forwards the stripped data packet to the receiving customer domain as specified in the customer domain tag.

33 Claims, 4 Drawing Sheets

U.S. PATENT DOCUMENTS

| | | |
|---|---|---|
| 5,095,480 A | 3/1992 | Fenner |
| 5,115,431 A | 5/1992 | Williams et al. |
| 5,136,580 A | 8/1992 | Videlock et al. |
| 5,241,682 A | 8/1993 | Bryant et al. |
| 5,251,205 A | 10/1993 | Callon et al. |
| 5,274,631 A | 12/1993 | Bhardwaj |
| 5,287,103 A | 2/1994 | Kasprzyk et al. |
| 5,304,992 A | 4/1994 | Harashima |
| 5,311,509 A | 5/1994 | Heddes et al. |
| 5,313,582 A | 5/1994 | Hendel et al. |
| 5,317,562 A | 5/1994 | Nardin et al. |
| 5,319,644 A | 6/1994 | Liang |
| 5,345,446 A | 9/1994 | Hiller et al. |
| 5,353,383 A | 10/1994 | Uchimura et al. |
| 5,361,256 A | 11/1994 | Doeringer et al. |
| 5,371,852 A | 12/1994 | Attanasio et al. |
| 5,394,394 A | 2/1995 | Crowther et al. |
| 5,394,402 A | 2/1995 | Ross |
| 5,408,469 A | 4/1995 | Opher et al. |
| 5,423,002 A | 6/1995 | Hart |
| 5,426,637 A | 6/1995 | Derby et al. |
| 5,473,599 A | 12/1995 | Li et al. |
| 5,473,607 A | 12/1995 | Hausman et al. |
| 5,485,455 A | 1/1996 | Dobbins et al. |
| 5,500,860 A | 3/1996 | Perlman et al. |
| 5,519,704 A | 5/1996 | Farinacci et al. |
| 5,526,489 A | 6/1996 | Nilakantan et al. |
| 5,550,816 A * | 8/1996 | Hardwick et al. ........... 370/401 |
| 5,555,256 A | 9/1996 | Calamvokis |
| 5,604,868 A | 2/1997 | Komine et al. |
| 5,617,421 A | 4/1997 | Chin et al. |
| 5,651,002 A | 7/1997 | Van Seters et al. |
| 5,666,363 A | 9/1997 | Osakabe et al. |
| 5,684,800 A | 11/1997 | Dobbins et al. |
| 5,740,171 A | 4/1998 | Mazzola et al. |
| 5,742,604 A | 4/1998 | Edsall et al. |
| 5,752,003 A | 5/1998 | Hart |
| 5,764,636 A | 6/1998 | Edsall |
| 5,790,541 A * | 8/1998 | Patrick et al. .............. 370/392 |
| 5,825,772 A * | 10/1998 | Dobbins et al. ............ 370/401 |
| 5,872,783 A | 2/1999 | Chin |
| 5,892,912 A | 4/1999 | Suzuki et al. |
| 5,910,955 A | 6/1999 | Nishimura et al. |
| 5,946,308 A | 8/1999 | Dobbins et al. |
| 5,956,335 A | 9/1999 | Backes et al. |
| 5,959,968 A | 9/1999 | Chin et al. |
| 5,959,990 A | 9/1999 | Frantz et al. |
| 5,978,378 A | 11/1999 | Van Seters et al. |
| 6,023,563 A | 2/2000 | Shani |
| 6,035,105 A | 3/2000 | McCloghrie et al. |
| 6,075,776 A | 6/2000 | Tanimoto et al. |
| 6,111,876 A * | 8/2000 | Frantz et al. ............... 370/392 |
| 6,128,666 A | 10/2000 | Muller et al. |
| 6,147,995 A * | 11/2000 | Dobbins et al. ............ 370/392 |
| 6,157,647 A | 12/2000 | Husak |
| 6,163,543 A | 12/2000 | Chin et al. |
| 6,181,699 B1 | 1/2001 | Crinion et al. |
| 6,209,649 B1 | 4/2001 | Pringle et al. |
| 6,219,699 B1 | 4/2001 | McCloghrie et al. |
| 6,226,771 B1 | 5/2001 | Hilla et al. |

OTHER PUBLICATIONS

P. Srisuresh, "Security Model with Tunnel–mode IPsec for NAT Domains," Oct. 1999, ("RFC2709").

D. Provan, "Tunneling IPX Traffic Through IP Networks," Request for Comments 1234, Jun. 1991, ("RFC1234").

V. Rawat, et al., "Layer Two Tunneling Protocol (L2TP) over Frame Relay," Request for Comments 3070, Feb. 2001, ("RFC3070").

W. Townsley, et al., "Layer Two Tunneling Protocol 'L2TP'," Request for Comments 2661, Aug. 1999, ("RFC2661").

E. Rosen, et al., "Multiprotocol Label Switching Architecture," Request for Comments 3031, Jan. 2001, ("RFC3031").

K. Hamzeh et al., "Point–to–Point Tunneling Protocol (PPTP)," Request for Comments 2637, Jul. 1999, ("RFC2637").

D. McPherson, et al., "VLAN Aggregation for Efficient IP Address Allocation," Request for Comments 3069, Feb. 2001, ("RFC3069").

B. Gleeson, et al., "A Framework for IP Based Virtual Private Networks," Request for Comments 2764, Feb. 2000, ("RFC2764").

* cited by examiner

Fig. 1

Fig. 2a – 802.3 Ethernet Packet (1514 bytes)

Fig. 2b – 802.1Q Tagging Format Packet (1514 + 4 bytes)

Fig. 2c – VMAN Tagging Format Packet (1514 + 4 + 4 bytes)

METHOD AND SYSTEM FOR VMAN PROTOCOL

BACKGROUND OF THE INVENTION

1. Field of the Invention

The present invention relates to the field of virtual metropolitan area network (VMAN) topologies and internetwork communications technologies. In particular, the present invention relates to a protocol for use in a VMAN network architecture to route and forward data packets according to the VMAN configuration.

2. Background Information and Description of Related Art

A metropolitan area network (MAN) is a network that interconnects users with computer resources in a geographic area or region larger than that covered by a local area network but smaller than the area covered by a wide area network. The term is typically applied to the interconnection of networks in a city into a single larger network (which may then also offer efficient connection to a wide area network). The amount of data traffic being sent over MANs is increasing at an exponential rate. This is due in part to the increasingly ubiquitous use of the Internet by consumers and businesses, as well as the increasingly bandwidth-intensive nature of the Internet applications that are being deployed.

An important aspect of MANs is the ability of MAN service providers to create virtual private network network connections (VPNs) across a single MAN infrastructure, referred to as a virtual metropolitan area network (VMAN). VMANs allow customers having multiple locations within a metropolitan area to transport private traffic, including virtual local area network (VLAN) traffic, over the shared single MAN.

However, the use of vMANs to handle traffic from multiple customers over a single MAN creates access and security issues. Therefore, it is important to segregate one customer from another so that there is no co-mingling of traffic.

In addition, customer traffic must be transported over the MAN without interfering with the customers' own higher-layer protocols such as DECnet, or private IP subnets. For example, the DECnet Phase IV protocol can cause problems when routed to a Layer 2 MAN because the DECnet protocol changes the media access control (MAC) address in the packet's datalink header. Since duplicate MAC addresses are typically not allowed, MAN service providers end up managing DECnet streams by hand—something which neither the provider nor the customer wants.

Accordingly, a new approach is needed to securely manage traffic in a VMAN network architecture while not interfering with higher level protocols.

SUMMARY

According to one aspect of the invention, a method and system is provided in which a VMAN protocol is used to segregate MAN traffic at a customer and a provider domain level. A switch at the edge of the MAN encapsulates a customer data packet from an initiating 802.1Q customer domain in a new Ethernet header, which is used to specify the IEEE 802.1Q VLAN tags as determined by the customer-related VLAN configurations. A switch at the core of the MAN encapsulates the data packet further in another new Ethernet header, which is used to specify new VMAN tags as determined by the MAN service provider VMAN configurations. The nested encapsulation is repeated as necessary until the data packet is eventually forwarded to a remote switch at the edge of the MAN in accordance with the VMAN configuration, or the source and destination address in the original data packet. The remote switch strips the VMAN tags from the data packet, and forwards the stripped data packet to the receiving 802.1Q customer domain as specified in the IEEE 802.1Q VLAN tag.

According to one aspect of the invention, apparatus are provided to carry out the above and other methods.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a VMAN protocol method and system, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and system is implemented in a router, server or gateway, as a software routine, hardware circuit, firmware, or a combination thereof.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
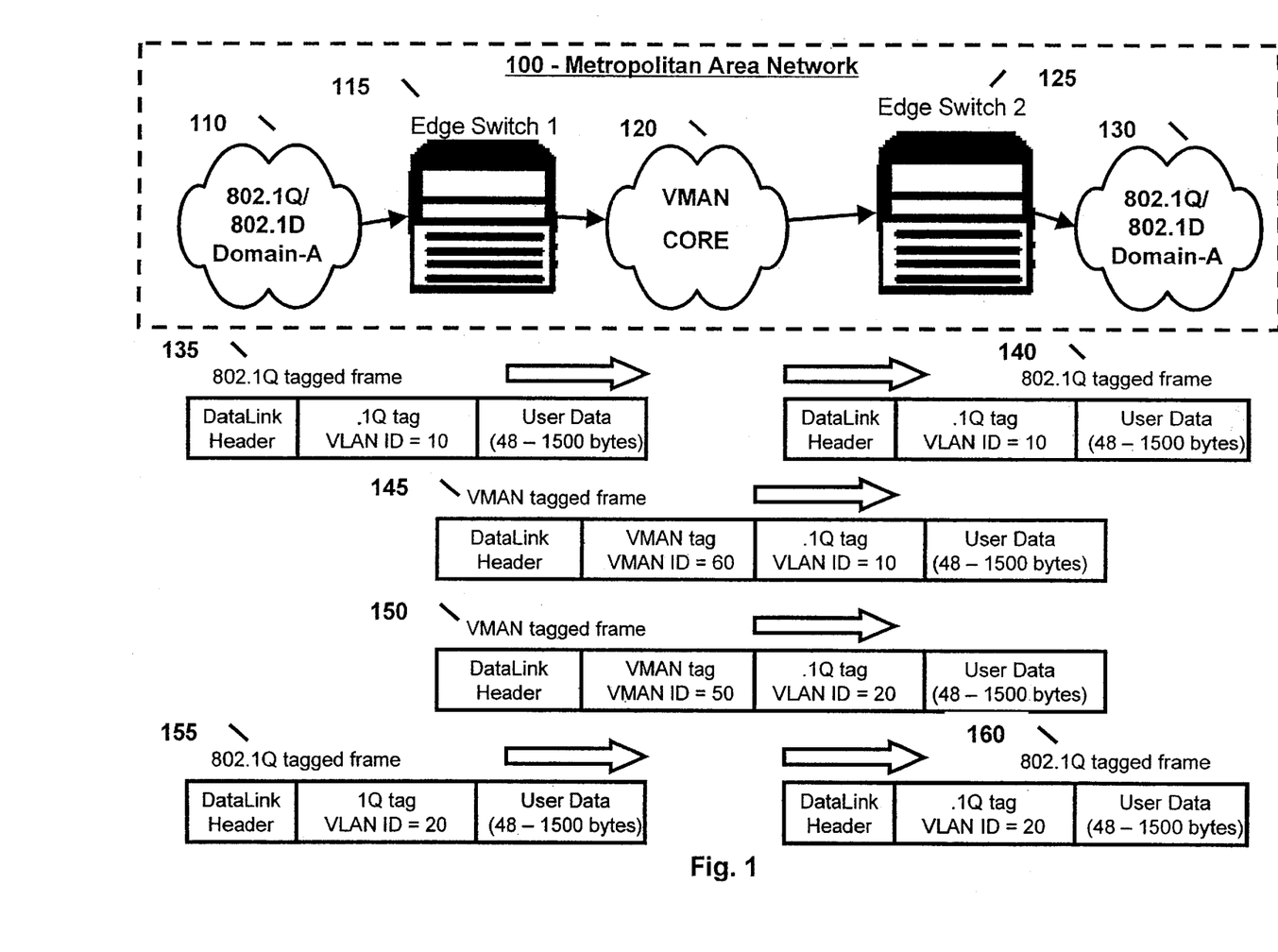
FIG. 1 illustrates a diagram overview of a Metropolitan Area Network (MAN) configuration and corresponding data packet tagged formats in accordance with one embodiment of the present invention.

Referring now to FIG. 1, wherein a block diagram overview of a Metropolitan Area Network (MAN) configuration and corresponding data packet tagged formats in accordance with one embodiment of the present invention is shown. As illustrated, a MAN 100 includes a first edge switch 1 115 connects a first 802.1Q Domain-A 110 to the VMAN CORE 120, which in turn is connected via a second edge switch 2 125 to a second 802.1Q Domain-A 130. In one embodiment, each of the 802.1Q Domain-As 110/130 may include one or more virtual local area networks (VLANs) belonging to a particular customer of the MAN 100.

Data packets originating within the VLANs of the 802.1Q domains in the illustrated embodiment carry a VLAN identification that can be used to provide intra-VLAN communication using existing layer-2 VLAN forwarding mechanisms. While no other information is needed, additional constraints and layer-2 filtering can be defined as needed to improve performance and security. As there is no single official standard protocol for communication of VLAN information, existing VLAN forwarding mechanisms may be employed, including proprietary VLAN communication protocols. The method commonly used is known as "frame-tagging." In frame-tagging, packets originating from a host belonging to a VLAN acquire a VLAN identifier (VLAN ID) as they are switched onto a shared backbone network. The VLAN ID is what enables the receiving switches to forward the packets intelligently by switching the packets to only those switches that are members of the same VLAN. A non-proprietary VLAN communication protocol has been incorporated into the Institute for Electrical and Electronics Engineers (IEEE) 802.1Q standard, whereby the VLAN ID is part of the IEEE 802.1Q header inserted between the DataLink header (i.e. the Media Access Control (MAC) header) and the frame's user data. This is also referred to as an 802.1Q tagged frame.

When the 802.1Q tagged frame is transported over the MAN 100 the MAN service provider must insure that the data packet is segregated from other customer traffic so as not to compromise the security of the packet or cause conflict with other customer traffic. In the illustrated embodiment, the packets are segregated using VMANs. A VMAN allows certain traffic designated with a VMAN identifier to be forwarded along a particular path to only destinations belonging to the same VMAN. In the illustrated embodiment, an 802.1Q tagged frame 135 represents a data packet sent by a customer having a 0.1Q tag with VLAN ID=10 in the first 802.1Q Domain-A 110. Upon receipt by the first edge switch 1 115, the 802.1Q tagged frame 135 is converted to a VMAN tagged frame 145 by encapsulating it in a new Ethernet data packet containing a VMAN tag with a VMAN ID=60. The VMAN tagged frame 145 is then received by the VMAN CORE 120, which forwards the VMAN tagged frame 145 to a second edge switch 125 according to VMAN tag with the VMAN ID=60. Depending on the architecture of the MAN, the VMAN CORE 120 may include one or more core switches that perform routing and forwarding of network traffic based on the VMAN ID and the destination media access control (MAC) address. The encapsulation of the 802.1Q tagged frame 135 may be repeated as necessary, depending upon the architecture of the MAN. In one embodiment, the data packet sent by the customer may be an untagged frame, such as an Ethernet frame in accordance with the IEEE 802.1D protocol. Upon receipt by the second edge switch 2 130 the VMAN tagged frame 145 is stripped of the VMAN tag with VMAN ID=60. The stripped VMAN tagged frame 140 is then forwarded to the proper customer in VLAN 10 according the 0.1Q tag VLAN ID=10. In the case of untagged frames, the proper customer is determined from a value in the edge switch 2 130 and the destination MAC address.

A similar process is illustrated in the 802.1Q tagged frame 155 with a 0.1Q tag of VLAN ID=20. The first edge switch 1 115 converts the 802.1Q tagged frame 155 to VMAN tagged frame 150 by adding the VMAN tag with a VMAN ID=50 after the DataLink Header portion of the 802.1Q tagged frame 155. Upon receipt, the second edge switch 2 130 then converts the VMAN tagged frame 150 by stripping it of the VMAN tag with VMAN ID=50, resulting in the 802.1Q tagged frame 160 with a 0.1Q tag VLAN ID=20. The stripped VMAN tagged frame 160 is then routed to the proper customer in VLAN 20 according the 0.1Q tag VLAN ID=20.

As can be seen from the foregoing description, the illustrated embodiment of the present invention makes it possible to create separate customer and provider domains for data packets transported over a single MAN 100. Customer domain encapsulation is performed at the edge of the MAN 100 using 802.1Q frame-tagging where the VMAN-enabled switches enforce other customer-related priorities and policies, while the provider encapsulation is performed at the core of the MAN 100. This nested encapsulation gives the MAN service provider a opportunity to create VMANs for their own use, without interfering with the flow of customer traffic.

For example, provider VMANs can be used to connect customers to third-party services such as Internet Service Providers (ISPs) or Application Service Providers (ASPs). Since the connections to the ISPs and ASPs are transported over a VMAN, the customers can easily switch ISPs without disrupting their service. MAN service providers can also use VMANs to consolidate traffic and centralize value-added services like VPNs or managed firewalls. Rather than being forced to install and maintain equipment on or near the customer premises—an expensive, labor-intensive task—providers can aggregate customer traffic for value-added services at a central office. This not only saves on the cost of providing administrative staff, but achieves better economies of scale and gives customers more reliable service. Better economies of scale are achieved due in part to the fact that each VMAN switch can set up and manage up to 4,096 VMANs.

In the illustrated embodiment, 802.1Q tagged frames are used to encapsulate data packets at the customer domain level. However, it should be understood that other variations for determining the customer domain using IP subnets or other high-level protocols may be employed without departing from the principles of or exceeding the scope of the present invention. Moreover, while the description of the embodiments of the present invention address the method and system as it applies to use by a MAN service provider, it is appreciated by those of ordinary skill in the art that method is generally applicable to any network service provider that services multiple customers over any Internet-working application including, Local Area Networks (LANs), and Wide Area Networks (WANs).

Figure 2A:
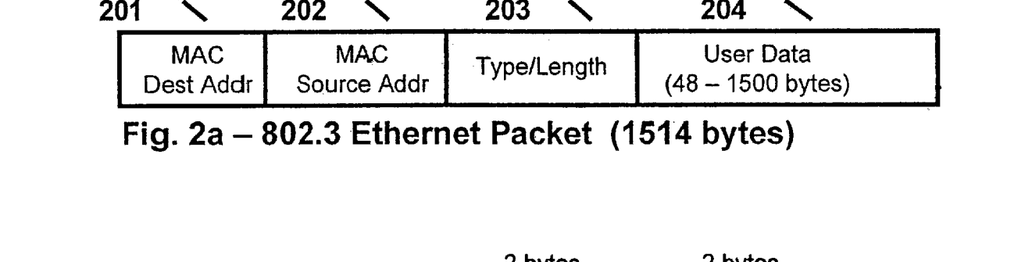
FIG. 2 illustrates a more detailed diagram of the data packet tagged formats in accordance with one embodiment of the present invention.
Figure 2B:
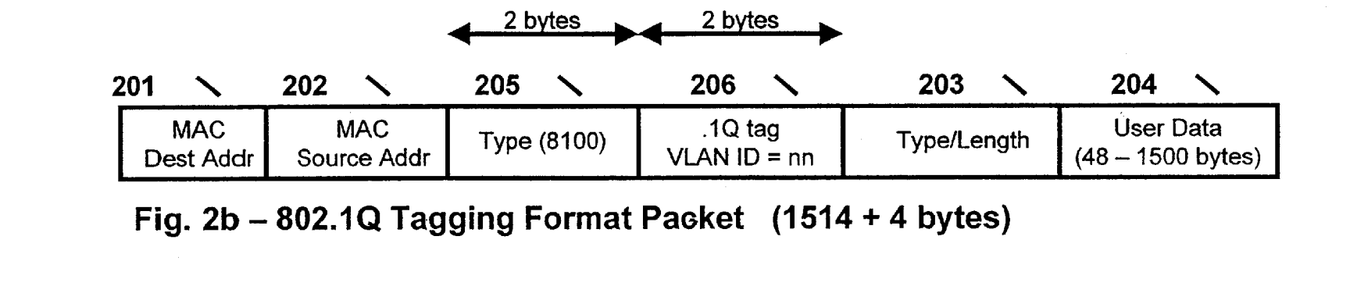
Figure 2C:
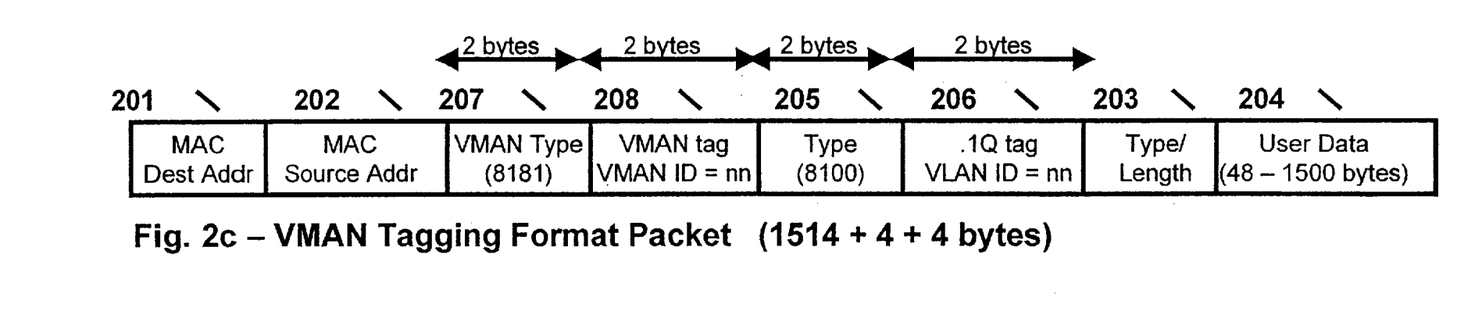

Referring now to FIGS. 2a–2c, wherein a more detailed diagram of the VMAN protocol is illustrated in accordance with one embodiment of the present invention. FIG. 2a illustrates an Ethernet packet as one type of data packet that may be transported over the MAN 100. The Ethernet packet format is known in the art and has been incorporated into the IEEE 802.3 standard for LANs using Ethernet technology. As shown, the Ethernet data packet may be up to 1514 bytes in length and comprises several well-known fields including the data link layer fields of the Media Access Control (MAC) destination address 201, the address of the host to which the packet is addressed and the MAC source address 202, the address of the host from which the packet originated. The type/length field 203 indicates the type of data packet and the length of the data packet. Lastly, the user data 204 is the data field which contains the actual user data which the packet is carrying from the source to the destination.

FIG. 2b illustrates an embodiment of the 802.1Q tagged format of the previously described 802.1Q tagged frames 135, 140, 155, and 160, in further detail. The 802.1Q tagged format is known in the art and has been incorporated into the IEEE 802.1Q standard for VLAN communication. In addition to the MAC destination address 201, MAC source address 202, type/length 203, and user data 204 as already described, the 802.1Q tagged frame format includes an additional 4 bytes of data in type data field 205 and 0.1Q tag VLAN ID 206. In one embodiment the type field 205 is a 2-byte hexadecimal number, e.g. "H8100," that defines the type of tag being used in the data packet, in this case the 0.1Q tag VLAN ID 206. This type field 205 provides the information to the switch that is necessary to interpret the contents of the 0.1Q tag VLAN ID 206. In the illustrated embodiment, the 0.1Q tag VLAN ID 206 is also a 2-byte field, and may also be formatted as a hexadecimal number that identifies the VLAN to which the data packet belongs.

FIG. 2c illustrates an embodiment of the VMAN tagged format of the previously described VMAN tagged frames 145 and 150, in further detail. In addition to the MAC destination address 201, MAC source address 202, type/length 203, user data 204, type 205, and 0.1Q tag VLAN ID 206 as already described, the VMAN tagged frame format includes an additional 4 bytes of data in type data field 207 and VMAN tag VMAN ID 208. In one embodiment the type field 205 is a 2-byte hexadecimal number, e.g. "H8181," that defines the type of tag being used in the data packet, in this case the VMAN tag VMAN ID 208. The type field 207 provides the identifying information to the switch that is necessary to interpret the contents of the VMAN tag VMAN ID 208. In the illustrated embodiment, the VMAN tag VMAN ID 208 is also a 2-byte field, and may also be formatted as a hexadecimal number that identifies the VMAN to which the data packet belongs.

In one embodiment, the use of new Ethernet headers in the form of the type 205/207 and tag 206/208 fields constitute encapsulating the data packet into a customer domain and provider domain respectively. The encapsulation allows the MAN service providers to transport data packets over a single MAN without co-mingling different customers' traffic. In addition, the encapsulation allows the MAN service providers to aggregate traffic according to provider-defined domains.

Figure 3:
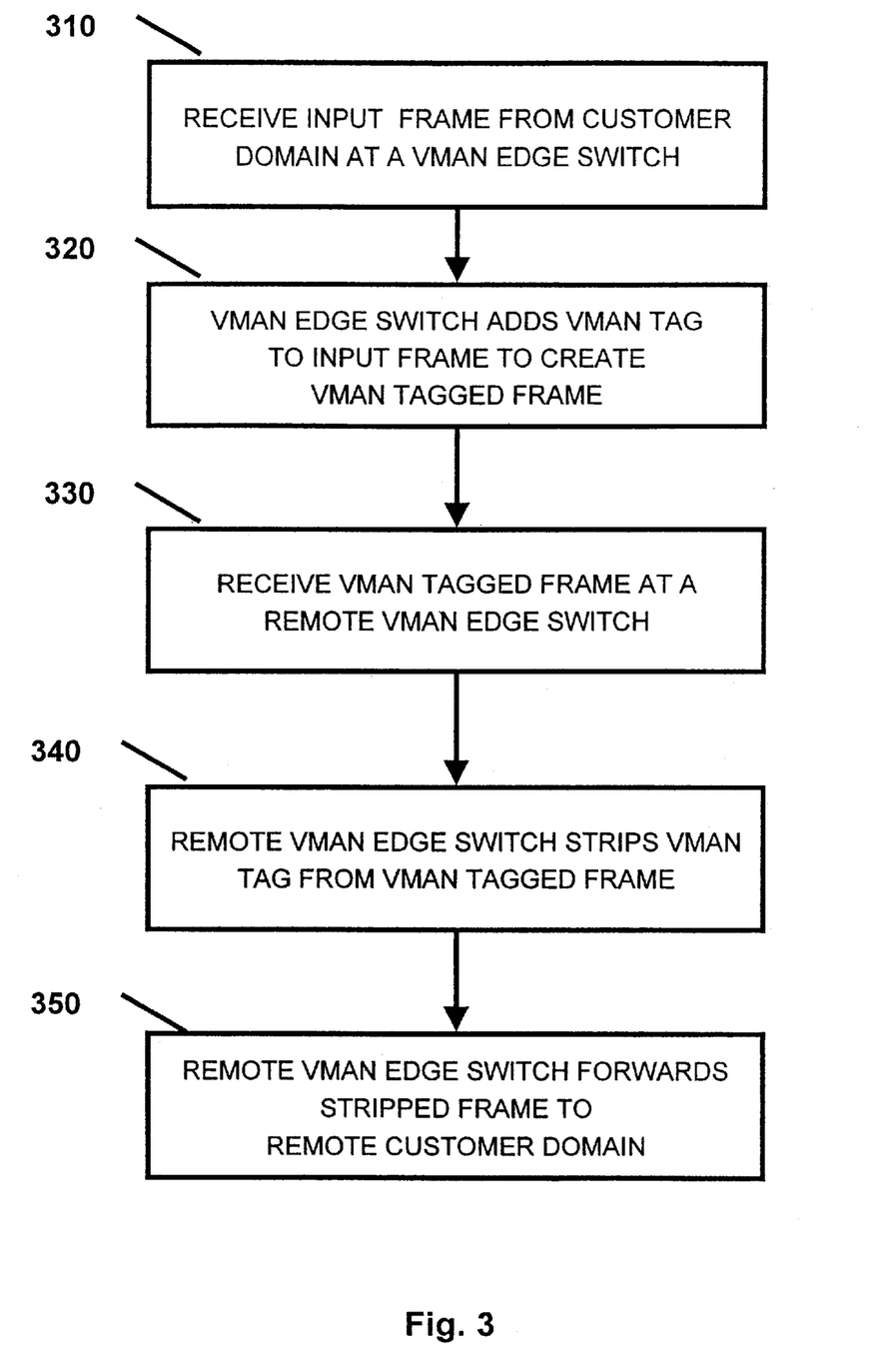
FIG. 3 illustrates a flow diagram of the operation of one embodiment of a MAN using a VMAN protocol in accordance with one embodiment of the present invention.

Referring now to FIG. 3, wherein a flow diagram of the operation of a MAN using a VMAN protocol is illustrated in accordance with one embodiment of the present invention. As shown, in process block 310 a VMAN-enabled switch located at the edge of a MAN receives an input frame (e.g. an 802.1Q tagged or 802.1D untagged frame) specifying the data packet as belonging to a particular VLAN from a particular customer domain. In process block 320, the VMAN-enabled edge switch adds a VMAN tag to the input frame to create a new VMAN tagged frame that encapsulates the original input frame. The VMAN-enabled edge switch may incorporate logic to insure that the addition of the VMAN tag will not exceed the VMAN protocol legal frame limit. In one embodiment, the legal frame limit is 1514 bytes plus 4 additional bytes for each tag for a total of 1522 bytes. However, the method and system of the present invention does not limit the number of nested encapsulations that can be used. As a result, the frame length is the original frame length plus 4 additional bytes for each layer of encapsulation. At process block 330 the VMAN tagged frame is forwarded by a core switch of the MAN to the appropriate VMAN-enabled edge switch according the VMAN tag in the VMAN tagged frame. At process block 340, upon receipt of the VMAN tagged frame, the VMAN-enabled edge switch strips the VMAN tag from the VMAN tagged frame as it is no longer needed. After stripping, the remaining data packet is the input frame that was originally sent by the customer domain. At process block 350, the receiving remote VMAN-enabled edge switch forwards the stripped frame (i.e. the original input frame) to the proper remote customer domain in accordance with the remaining 0.1Q tag VLAN ID in the case of an 802.1Q input frame. In the case of an untagged input frame, the receiving remote VMAN-enabled edge switch forwards the stripped frame in accordance with the destination MAC address and forwarding data stored internally to the switch.

Figure 4:
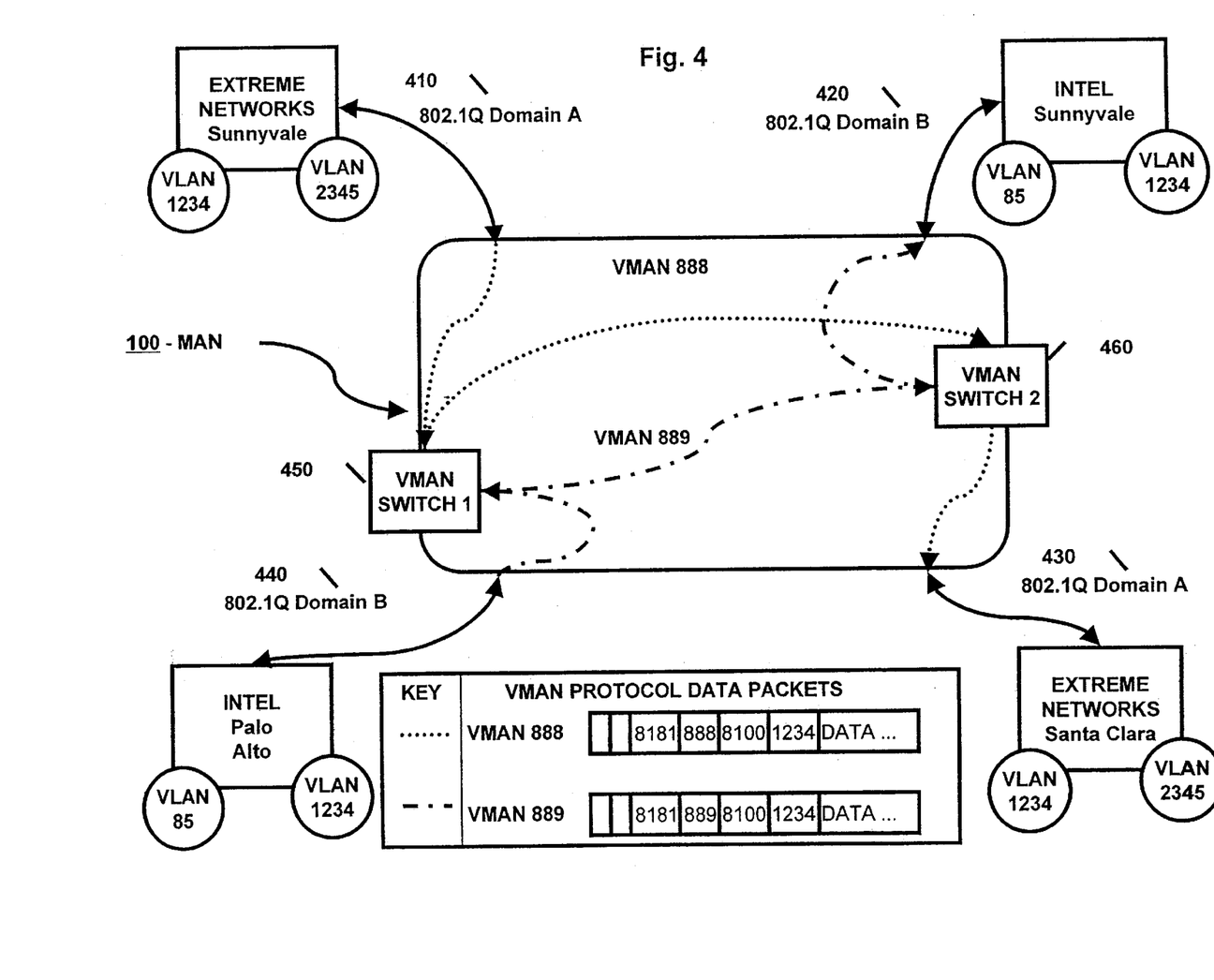
FIG. 4, illustrates an example implementation of a MAN using a VMAN protocol in accordance with one embodiment of the present invention.

Referring now to FIG. 4, wherein an example implementation of a MAN using a VMAN protocol is illustrated in accordance with one embodiment of the present invention. As shown, there are two different customers, Intel and Extreme Networks, each with two different customer sites. The customer Extreme Networks is illustrated as having 802.1Q domain A with two different sites. The first Extreme Networks site 410 is located in Sunnyvale and there are two VLANs associated with the site, VLAN 1234 and VLAN 2345. The second Extreme Networks site 430 is located in Santa Clara with the same VLANs 1234, and 2345. The customer Intel is illustrated as having 802.1Q domain B with two different sites as well. The first Intel site 420 is located in Sunnyvale, and there are two VLANs associated with the site, VLAN 85, and VLAN 1234. The second Intel site 440 is located in Palo Alto, and there are the same two VLANs associated with the site, VLANs 85 and 1234. Note that both Intel and Extreme Networks customers use the same VLAN ID of 1234 to designate one of their multi-site VLANs. To avoid conflict, the VMAN Switch 1 450 encapsulates the data packets sent from Intel Palo Alto 440 in a new packet having a VMAN tag with a VMAN ID of 889. The tagged VMAN packet (also referred to as a frame) is received by VMAN Switch 2 460 where the VMAN ID of 889 is stripped from the data packet, and forwarded to the Intel Sunnyvale site's 420 corresponding VLAN as specified in the VLAN ID of the underlying 802.1Q tagged packet (frame). Similarly, the VMAN Switch 2 460 encapsulates the data packets sent from Extreme Networks Sunnyvale 410 in a new packet having a VMAN tag with a VMAN ID of 888. The tagged VMAN packet (also referred to as a frame) is received by VMAN Switch 1 450 where the VMAN ID of 888 is stripped from the data packet, and forwarded to the Extreme Network's Santa Clara site's 430 corresponding VLAN as specified in the VLAN ID of the underlying 802.1Q tagged packet (frame). A detailed example of the content of the tagged VMAN protocol data packets for one embodiment of the present invention is shown in FIG. 4. With reference to both FIG. 4 and FIG. 2c, for VMAN 888, after the MAC destination and source address, the tagged VMAN packet contains a VMAN type 207 of "8181" followed by a VMAN tag 208 with VMAN ID="888" followed by a VLAN type 205 of "8100" followed by a 0.1Q tag with VLAN ID="1234" followed by the packet's type/length 203 and user data 204. For VMAN 889, after the MAC destination and source address, the tagged VMAN packet contains a VMAN type 207 of "8181" followed by a VMAN tag 208 with VMAN ID="889" followed by a VLAN type 205 of "8100" followed by a 0.1Q tag with VLAN ID="1234" followed by the packet's type/length 203 and user data 204. As is shown, the data packets are securely transported to the proper destination as a result of the VMAN protocol processing which segregates the Intel from the Extreme Networks traffic by using the different VMAN designations.

Accordingly, a novel method and system is described for a VMAN protocol used in forwarding data packets by a MAN switch connecting multiple customers across a single MAN infrastructure. From the foregoing description, those skilled in the art will recognize that many other variations of the present invention are possible. In particular, while the present invention has been described as being implemented in a network comprising one or more MAN switches, such as edge switch 1 115, edge switch 2 130, core MAN switches in VMAN CORE 120, and customer domains such as the 802.1Q domains 110/130, some of the logic may be distributed in other components of a network or internetwork application.

For example, embodiments of the invention may be represented as a software product stored on a machine-accessible medium (also referred to as a computer-readable medium or a processor-readable medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. As an example, the procedures described herein for a encapsulating a data packet by edge switch 1 115, or forwarding a VMAN tagged frame by a core switch in VMAN CORE 120 can be stored on the machine-accessible medium. Those of ordinary skill in the art will appreciate that other instructions and operations necessary to implement the described invention may also be stored on the machine-accessible medium.

Thus, the present invention is not limited by the details described. Instead, the present invention can be practiced with modifications and alterations within the spirit and scope of the appended claims.

What is claimed is:

1. A system comprising:
  a metropolitan area network (MAN) to service a plurality of customers, wherein the MAN comprises a plurality of virtual metropolitan area networks (VMANs); and
  a plurality of switches to segregate data packets received from one of the plurality of customers from data packets received from another of the plurality of customers, the plurality of switches including:
    a first switch at an edge of the MAN to encapsulate each received data packet with a new header that contains a customer VMAN identifier (ID) that identifies the VMAN associated with the customer from which the data packet originated; and
    a second switch at another edge of the MAN to remove the VMAN encapsulation from each data packet before forwarding the data packet to another one of the plurality of customer domains with the same customer VMAN ID.

2. The system of claim 1, wherein the first switch to forward each encapsulated data packet to the second switch according to the data packet's customer VMAN ID.

3. The system of claim 1, wherein the plurality of switches further includes a third switch at the core of the MAN to forward each encapsulated data packet to the second switch and the first switch to forward to each encapsulated data packet to the third switch according to the customer VMAN ID associated with the data packet.

4. The system of claim 3, wherein the third switch to further encapsulate each data packet in a second encapsulation containing a VMAN identifier (ID) that identifies a provider VMAN associated with a provider that provides a common third-party service to two or more of the plurality of customers.

5. The system of claim 4, wherein the third switch to forward each encapsulated data packet to the second switch comprises the third switch to forward each encapsulated data packet to the second switch based on the customer VMAN ID and the provider VMAN ID.

6. The system of claim 4, wherein the plurality of switches further includes a fourth switch at the core of the MAN to forward each encapsulated data packet to the second switch based on the customer VMAN ID and the third switch to forward each encapsulated data packet to the fourth switch based on the provider VMAN ID.

7. The system of claim 1, wherein each data packet received at the first switch is an Institute of Electrical and Electronics Engineers (IEEE) 802.1Q tagged frame.

8. The system of claim 1, wherein each customer has one or more Virtual Local Area Networks (VLANs), and each data packet received at the first switch is tagged with a VLAN ID that specifies the VLAN from which the data packet originated.

9. The system of claim 1, wherein each encapsulated data packet has a length 4 bytes more than the length of the data packet received at the first switch.

10. The system of claim 4, wherein the common third-party service is a connection to an Internet Service Provider.

11. The system of claim 4, wherein the common third-party service is a connection to an Application Service Provider.

12. A method comprising:
  receiving a data packet from one of a plurality of customer domains at a first switch located at an edge of a metropolitan area network (MAN), the MAN comprising a plurality of virtual metropolitan area networks (VMANs);
  encapsulating the data packet at the first switch with a new header that includes a VMAN type and a VMAN identifier (ID), the VMAN ID identifying the VMAN associated with the customer domain from which the data packet originated;
  forwarding the encapsulated data packet to a second switch located at another edge of the MAN according to the VMAN ID;
  removing the VMAN encapsulation from the data packet at the second switch; and
  forwarding the data packet from the second switch to another one of the plurality of customer domains with the same VMAN ID.

13. The method of claim 12, wherein each customer domain comprises a plurality of virtual local area networks (VLANs) and the data packet received at the first switch is tagged with a VLAN type and a VLAN identifier (ID) identifying the VLAN from which the data packet originated.

14. The method of claim 13, wherein forwarding the data packet from the second switch to another one of the plurality of customer domains comprises forwarding the data packet from the second switch to another one of the plurality of customer domains with the same VMAN ID and the same VLAN ID.

15. The method of claim 13, wherein the data packet received the first switch is an Institute of Electrical and Electronics Engineers (IEEE) 802.1Q tagged frame.

16. The method of claim 12, wherein forwarding the encapsulated data packet to the second switch comprises forwarding the data packet from the first switch to a third switch at the core of the MAN and forwarding the data packet from the third switch to the second switch according to the data packet's VMAN ID.

17. The method of claim 16, wherein forwarding the data packet from the third switch to the second switch comprises encapsulating the data packet in a second nested encapsulation containing a second VMAN ID that identifies a second VMAN associated with a provider that provides a common third-party service to two or more of the plurality of customers domains and forwarding the data from the third switch to the second switch based on the data packet's two VMAN IDs.

18. The method of claim 17, wherein forwarding the data from the third switch to the second switch based on the data packet's two VMAN IDs comprises forwarding the data from the third switch to a fourth switch at the core of the MAN based on the second VMAN ID and forwarding the data packet from the fourth switch to the second switch based on the data packet's first VMAN ID.

19. The method of claim 13, wherein the VLAN type is a hexadecimal value "8100" having a length of 2 bytes.

20. The method of claim 12, wherein the VMAN type is a hexadecimal value "8181" having a length of 2 bytes.

21. The method of claim 12, wherein the VMAN ID is a hexadecimal value having a length of 2 bytes.

22. The method of claim 12, wherein the encapsulated data packet has a length 4 bytes more than the length of the data packet received at the first switch.

23. An article of manufacture comprising a machine-accessible medium including content that when accessed by a machine causes the machine to:

receive a data packet from one of a plurality of customer domains at a first switch located at an edge of a metropolitan area network (MAN), the MAN comprising a plurality of virtual metropolitan area networks (VMANs);

encapsulate the data packet at the first switch with a new header that includes a VMAN type and a VMAN identifier (ID), the VMAN ID identifying the VMAN associated with the customer domain from which the data packet originated;

forward the encapsulated data packet to a second switch located at another edge of the MAN according to the VMAN ID;

remove the VMAN encapsulation from the data packet at the second switch; and forward the data packet from the second switch to another one of the plurality of customer domains with the same VMAN.

24. The article of manufacture of claim 23, wherein each customer domain comprises a plurality of virtual local area networks (VLANs) and the data packet received at the first switch is tagged with a VLAN type and a VLAN identifier (ID) identifying the VLAN from which the data packet originated.

25. The article of manufacture of claim 24, wherein a machine accessible medium including content that when accessed by a machine causes the machine to forward the data packet from the second switch to another one of the plurality of customer domains comprises a machine accessible medium including content that when accessed by a machine causes the machine to forward the data packet from the second switch to another one of the plurality of customer domains with the same VMAN ID and the same VLAN ID.

26. The article of manufacture of claim 24, wherein the data packet received the first switch is an Institute of Electrical and Electronics Engineers (IEEE) 802.1Q tagged frame.

27. The article of manufacture of claim 23, wherein a machine accessible medium including content that when accessed by a machine causes the machine to forward the encapsulated data packet to the second switch comprises a machine accessible medium including content that when accessed by a machine causes the machine to forward the data packet from the first switch to a third switch at the core of the MAN and forward the data packet from the third switch to the second switch according to the data packet's VMAN ID.

28. The article of manufacture of claim 27, wherein a machine accessible medium including content that when accessed by a machine causes the machine to forward the data packet from the third switch to the second switch comprises a machine accessible medium including content that when accessed by a machine causes the machine to encapsulate the data packet in a second nested encapsulation containing a second VMAN ID that identifies a second VMAN associated with a provider that provides a common third-party service to two or more of the plurality of customers domains and forward the data from the third switch to the second switch based on the data packet's two VMAN IDs.

29. The article of manufacture of claim 28, wherein a machine accessible medium including content that when accessed by a machine causes the machine to forward the data from the third switch to the second switch based on the data packet's two VMAN IDs comprises a machine accessible medium including content that when accessed by a machine causes the machine to forward the data from the third switch to a fourth switch at the core of the MAN based on the second VMAN ID and forward the data packet from the fourth switch to the second switch based on the data packet's first VMAN ID.

30. The article of manufacture of claim 24, wherein the VLAN type is a hexadecimal value of "8100" having a length of 2 bytes.

31. The article of manufacture of claim 23, wherein the VMAN type is a hexadecimal value of "8181" having a length of 2 bytes.

32. The article of manufacture of claim 23, wherein the VMAN ID is a hexadecimal value having a length of 2 bytes.

33. The article of manufacture of claim 23, wherein the encapsulated data packet has a length 4 bytes more than the length of the data packet received at the first switch.

* * * * *